Patented Nov. 3, 1936

2,059,430

UNITED STATES PATENT OFFICE 2,059,430

RUBBER COMPOSITIONS

Thomas Arnold and Stanley Arnold, Bradford, England

No Drawing. Application June 19, 1934, Serial No. 731,310. In Great Britain June 23, 1933

3 Claims. (Cl. 106—23)

This invention relates to improvements in compositions containing rubber for the production of various materials for useful purposes, such as for surface material for roads, paths, and for building materials on the one hand, and on the other hand for tyres, boots and shoes, belts, upholstery, and clothing material, or for purposes where resistance to friction is required, these examples being given to show a range of purposes, but they do not necessarily include all.

Broadly our invention consists in the rubberizing of suitable finely powdered dusts to produce resilient and elastic material which by mixing, rolling, pressing, moulding, or hammering, produces articles for useful purposes such as hereinbefore indicated.

Our invention is in the nature of a complete and satisfactory blending with rubber or rubber latex of suitable finely produced dusts, slag in every case comprising at least a portion of such dust, the fineness or coarseness (relatively) of which is determined by and for what use it is ultimately intended.

On account of the results obtained we prefer to use blast furnace slags ground to dust and blend them perfectly with rubber or rubber latex to form a plastic or semi-plastic mixture from which any rolled, pressed, moulded, or hammered material or article desired can be formed.

In the blending of the said materials in large quantities we employ a suitable neutralizer preferably alkaline in order to arrest the rapid action of sulphuric acid on the rubber which appears to be generated when the two ingredients come together.

One outstanding feature of the slag and rubber mixture is that it improves with age, as opposed to usual rubber mixtures which, as well known, deteriorate if only slowly from the time of manufacture.

Whilst slag alone may be utilized, we wish it to be understood that so long as a proportion of slag is used we may blend other materials or dusts, obtained by grinding materials such as sand, coal, coke, cement, pumice, granite, or like materials.

To carry our invention into effect, in a preferred form we utilize ordinary blast slag or other iron and steel slags and reduce them to a finely powdered state by suitable machinery. The finer the resultant powder the more successful the ultimate blending and amalgamation with the rubber or rubber latex espcially for materials of fine finish.

We find open tipped blast furnace slag gives best results, being easier to grind, quicker in its blending properties, retains more sulphur by its quicker cooling, and generally gives better results than ball slag, or slags called cements.

For facility, easier blending, and economy in manipulation we prefer to use rubber latex, almost any grade will do.

When highly sulphurized or open tipped slag is used it will be found necessary to use alkaline neutralizers for perfect mixing. We give commercial soda as a suitable example. This and other alkalies can be used and serves to arrest temporarily the acid reaction which appears to be generated when the slag and latex come together.

Ball slag, water or steam cooled slags, highly limed slags and low sulphured slags will require less neutralizing.

As we have stated we prefer latex mixings with slag as beyond the fact it can be mixed with the rubber with a fraction of the horse power required by mixing on rolls and retain its elastic tendencies, a fibrous nature is also set up in time which is observable. One outstanding feature in slag and rubber mixture is improvement with age. All other rubber mixtures deteriorate from the time of manufacture, if slowly.

We prefer to use slag as a base as opposed to coal, coke, lime, sand, limestone, cements, "aluminate or silicate", granite, pumice, or other like material, as we find slag proves self curing against proteid decomposition, that is the addition of slag dust opposed to other dusts prevents the decomposition of the proteids in the rubber and further produces a harder and tougher material, but we may use slag in combination with the ground materials hereinbefore mentioned.

The use of vulcanizers, fillers, and agers, well known to the trade can be incorporated when found necessary or any of the systems in use such as steam curing.

Any of the resultant material may be cast into blocks, moulded into slabs, and, after consolidation, may be cut up into any desired weight or size, and the portions rolled, moulded, or pressed into any shape for the end in view.

As examples we give the following processes with slag dusts which can be of pounds or hundredweights.

*Process 1,* which we term the latex or wet process, takes 2½ ounces of 40% latex and 3 to 4 ounces of fine ground slag. Into the latex pour a very slow and small stream, but continuously, the medium ground slag, stirring with a stirrer gently and continuously until coagulation appears. Extreme care must be taken to follow this instruction as the whole success of mixing dry dusts with latex depends on this being carried out.

When coagulation appears, stop the stirring, when the mixture stiffens so as to make the stirrer difficult to move. Then press very gradually until the mixture becomes a dough when it can be taken out and pressed or rolled.

The amount of slag taken up by the latex before stiffening will depend on the sulphur in the slag. Highly sulphurized slag will require retarding with a small portion of alkalies, such as commercial soda, to permit larger proportions of slag dust being used in the mixture when required.

Process 2

For a road block, slate, or slab, 2½ pounds of 40% latex, 2 pounds of blast furnace slag medium grind, ⅛ of a pound of carbon as an accelerator.

Neutralize the latex according to requirements, mix the carbon and slag thoroughly together, and then slag with latex until coagulation appears, then pour in mould brick size, allow to settle and dry, then press by ordinary brick machine. The same quantity will make three roofing slates by pressure.

For articles of curved lines like motor tyres, boots, etc., special moulds would be required. Articles of straight lines will only require pressing or rolling to required thickness. This material can be vulcanized at room temperature.

Process 3

Similar to Processes 1 and 2, but by the application of moderate moist heat the water can be pressed out and mouldings or castings speeded up.

This process, however, is inclined to prevent the fibrous like appearance developing, which it does in cold settling and maturing.

Process 4

Similar to Processes 1, 2, and 3, but after drying, heat up to a plastic state when the mixture or dough can be masticated and worked up in a very short time in the ordinary rolls, and moulded as required.

Process 5. Dry process

For tyres, belts, etc., masticate 100 pounds of raw rubber in rolls, add ⅛ pound carbon, then add the usual chemicals, then add slowly and distribute evenly along the rolls 50 pounds of very fine slag having passed through a 200 x 200 sieve, add last 5% sulphur.

This mix is a good average mix for tyres, belts, boots, shoes, etc.

Process 6

Alternately make up any usual tyre mix and then add 35% to 50% of the very fine slag thus using the slag as a filler and reinforcer, the carbon in this case acting as accelerator.

This or similar mixes can be used after vulcanizing as a filler for packing purposes by passing through rolls of different speeds when it is torn to shreds or short elastic strings.

Process 7

For flooring, clothing, upholstery, etc., a good average mix is rubber 100%, carbon 25%, slag dust very fine 75%. After mixing and rolling add vulcanizers for room temperature, colouring chemicals, and stiffeners, such as casein. To increase the tenacity and save tearing when coming off the rolls in large superficial areas, colouring can be arrived at by percentages of colours such as plumbago black, whiting white. In this mix latex gives better rolling results and more tenacious material.

Process 8

Similar results can be obtained by dissolving raw rubber in any of the well known solvents and adding finely ground slag to requirements then allowing solvent to evaporate.

This, for reasons of health and danger of fire, is not advisable, except for small and fancy articles which would not require large quantities of the solvent.

Solvents especially the terbenes or petrols tend to harden the mixture, articles made from it losing elasticity if not resilience.

Process 9

Relates to a mixing capable of application for boots, clothing, or upholstery wherein slag is blended with other dusts, and this mixing may be in the following proportions. Mix 25% of rubber (or 50% to 40% latex) with 25% of slag, 25% of cement, and 25% of carbon, rolling out the product as required.

What we claim is:

1. The method of producing a rubber composition which consists in providing a quantity of latex and a quantity of extremely fine slag dust, adding the slag dust in a slowly and continuously flowing small stream to the latex while continually stirring the mixture until all the slag has been added, and continuing the stirring until the latex coagulates.

2. The method of producing a rubber compositon which consists in providing a quantity of latex and a quantity of extremely fine slag dust, adding the slag dust in a slowly and continuously flowing small stream to the latex while continually stirring the mixture until all the slag has been added, continuing the stirring until the latex coagulates, and then pressing the mixture until it assumes a doughy consistency.

3. The method of producing a rubber composition which consists in providing a quantity of raw rubber and a quantity of extremely fine slag dust, adding the slag dust in a continuously flowing small stream to the raw rubber while continually stirring the mixture until the rubber and slag dust amalgamate into a homogeneous cementless mass.

THOMAS ARNOLD.
STANLEY ARNOLD.